United States Patent [19]

Field

[11] Patent Number: 5,621,841
[45] Date of Patent: Apr. 15, 1997

[54] OPTICAL FIBER CABLE CONTAINING RIBBONS IN STRANDED TUBES

[75] Inventor: Larry W. Field, Hickory, N.C.

[73] Assignee: Siecor Corporation, Hickory, N.C.

[21] Appl. No.: 531,359

[22] Filed: Sep. 20, 1995

[51] Int. Cl.⁶ ................................................. G02B 6/44
[52] U.S. Cl. ................................................. 385/113
[58] Field of Search .................................. 385/100–113

[56] References Cited

U.S. PATENT DOCUMENTS

| | | | |
|---|---|---|---|
| 4,446,686 | 5/1984 | Panuska et al. | 385/113 |
| 4,657,342 | 4/1987 | Baiier | 385/113 |
| 4,909,592 | 3/1990 | Arroyo et al. | 385/113 |
| 5,133,034 | 7/1992 | Arroyo et al. | 385/107 |
| 5,229,851 | 7/1993 | Rahman | 385/113 |
| 5,343,549 | 8/1994 | Nave et al. | 385/103 |
| 5,390,273 | 2/1995 | Rahman et al. | 385/112 |
| 5,531,064 | 7/1996 | Sawano et al. | 57/204 |

FOREIGN PATENT DOCUMENTS 2215081  9/1989  United Kingdom ................ 385/113

OTHER PUBLICATIONS

Siecor Corporation publication S/OC Rev. 5A, published 1985.
1988 IWCS pp. 305–314, "Fiber–Optic Cable for Shipboard Systems."

*Primary Examiner*—Akm E. Ullah
*Attorney, Agent, or Firm*—J. David Abernethy

[57] ABSTRACT

An optical fiber cable includes a central strength member, a plurality of optical ribbon-carrying tubes stranded around the central strength member in an alternating hand helix, and water-swellable yarns disposed in interstices between adjacent tubes. Pairs of electrical conductors may also be disposed in such interstices. A water-swellable tape is wrapped without substantial lay around the central strength member.

13 Claims, 4 Drawing Sheets

OPTICAL FIBER CABLE CONTAINING RIBBONS IN STRANDED TUBES

BACKGROUND OF THE INVENTION

The field of the invention is cables containing telecommunications elements such as optical fibers. Light waveguides will be referred to throughout as optical fibers. Such optical fibers normally include at least one protective outer coating.

Siecor's well-known Mini Bundle loose tube optical fiber cable contains a steel or dielectric central member having a plastic overcoat, a layer of buffer tubes stranded with reverse alternating lay around the central member, a viscous filling compound and a plurality of optical fibers loosely contained in each buffer tube, a layer of aramid fibers surrounding the buffer tubes, a viscous flooding compound filling spaces around the buffer tubes, and an outer sheath with an optional steel tape armor. Optical fibers within the buffer tubes have intended excess fiber length. Twisted pair electrical conductors inserted side-by-side with the buffer tubes have been provided as an optional feature. However, such insertion of the electrical conductors may cause the outer diameter of the cable to be increased.

Barnes, U.K. patent application GB 2,215,081, published Sep. 13, 1989, discloses a central strength member surrounded by a layer of plastic tubes stranded thereabout. Each plastic tube contains a stack of optical ribbons and is filled with a viscous filling compound. The layer of plastic tubes is surrounded by a paper tape and an outer plastic sheath, and a viscous flooding compound fills the cable interstices between the plastic tubes and the paper tape. The length of the optical ribbons is similar to the length of the plastic tubes, although there may be a slight excess length.

Another cable including a central member surrounded by tubes each holding a stack of optical ribbons and including a flooding compound is U.S. Pat. Nos. 5,229,851. This cable contains a viscous flooding compound, and the optical ribbons have an intended length which is greater than that of the tubes containing the optical ribbons.

Viscous flooding compounds used in the prior art cables discussed above between the buffer tubes and the outer sheath are messy when the cable must be entered in midspan to reroute or connectorize individual optical fibers or ribbons to reconfigure the network. Other means to protect the optical fibers from contact with moisture have been proposed for use in optical fiber cables. Those alternate means include tapes, yarns, and powders including water-absorbent materials therein.

SUMMARY OF THE INVENTION

It is therefore an object of the present invention to provide an optical fiber cable including tubes enclosing optical fiber ribbons and stranded around a central member, which cable contains sufficient protection against moisture without the use of a flooding compound.

Another object of the present invention is to provide an optical fiber cable having a central strength member and a layer of buffer tubes holding optical ribbons with the further provision of electrical conductor pairs with a better packing density than that provided by the prior art.

Another object of the present invention is to provide such cables having a water swellable tape wrapped around the central member in such a manner so as to avoid tension on the tape induced by wrapping with a substantial degree of lay, to allow the tape to freely expand upon contact with moisture into interstices between the central member and adjacent buffer tubes.

Still another object of the invention is to provide an optical fiber cable having low optical signal attenuation.

These and other objects are provided, according to the present invention, by a cable including a central member; a plurality of inner tubes wound around said central member with reverse alternating lay; a plurality of optical fiber ribbons and a water blocking material contained in at least a first tube of said inner tubes; an outer sheath containing said inner tubes; a tape enclosing said inner tubes disposed between said inner tubes and said outer sheath and delimiting interstices between respective adjacent inner tubes and said tape, said tape substantially inhibiting any ingress of moisture penetrating through the outer sheath to the inner tubes; and a water-swellable yarn disposed in an interstice.

Another cable according to the invention includes a longitudinally extending central member; a longitudinally extending water absorptive tape wrapped on the central member without a substantial degree of lay; a substantially fluid impervious outer plastic sheath containing the central member and tape; and at least one telecommunication element contained between the tape and the sheath.

A further cable according to the present invention includes a plurality of inner tubes, at least one of said tubes containing an optical fiber ribbon, said inner tubes stranded side-by-side in an alternating hand helix around a longitudinally extending central member which is substantially inextensible and incompressible in comparison with the tubes; an outer layer of material containing the inner tubes so as to delimit interspaces between respective adjacent inner tubes and the outer layer; and one or more metallic electrical conductors disposed in one of said interspaces.

Midspan access for the cable according to the invention is enhanced by providing buffer tubes having a wall thickness of less than 1 mm, in order that they may more easily be opened by craftspersons to access the optical fiber ribbons.

If desired, one or more of the buffer tubes may contain one or more bundles of optical fibers not in ribbons. Identification of the individual light waveguides is enhanced by color coding individual optical fibers, ribbons, yarns wrapped around optical fiber bundles, and buffer tubes containing optical fiber bundles or ribbons.

The optical fiber ribbons have a length which is not substantially greater than the length of the inner tubes holding such optical fiber ribbons.

BRIEF DESCRIPTION OF THE DRAWINGS

Preferred embodiments of the invention are shown in the several drawing figures, as follows.

DETAILED DESCRIPTION OF THE INVENTION

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
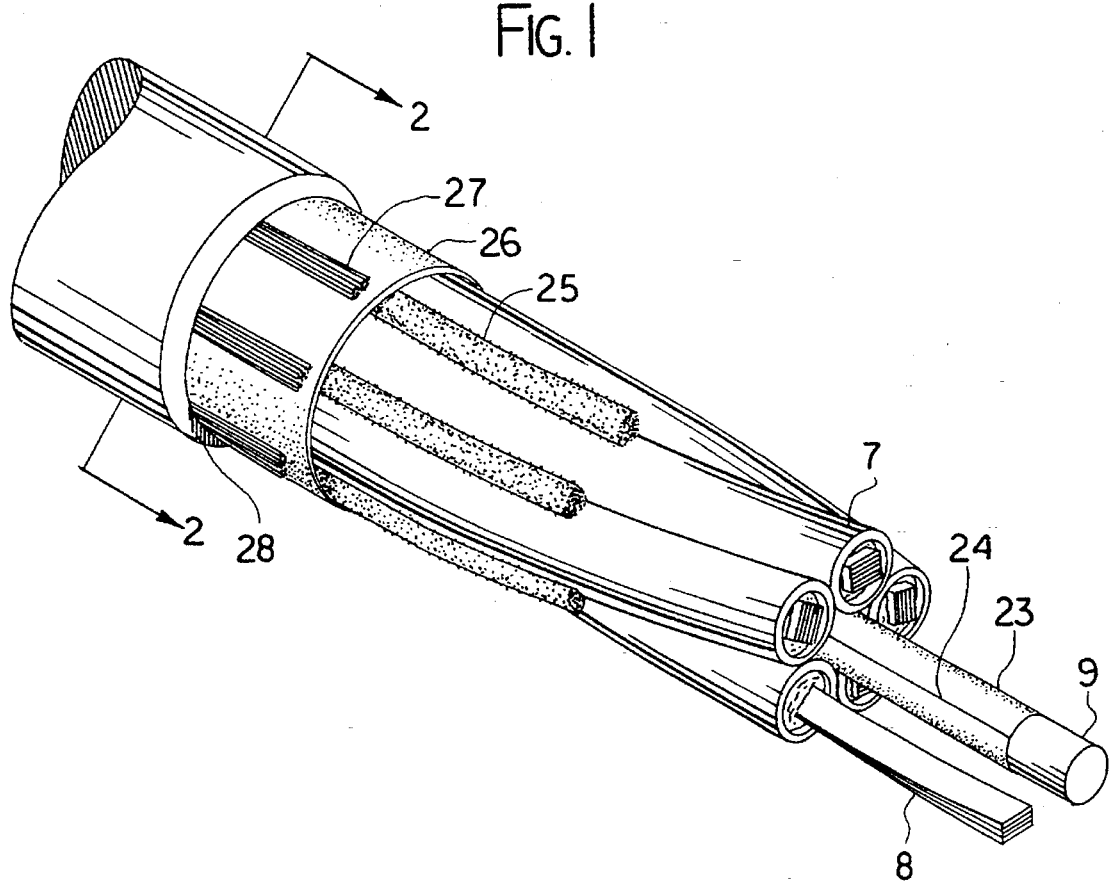
FIG. 1 is a perspective view of an improved optical fiber cable according to the invention.
Figure 2:
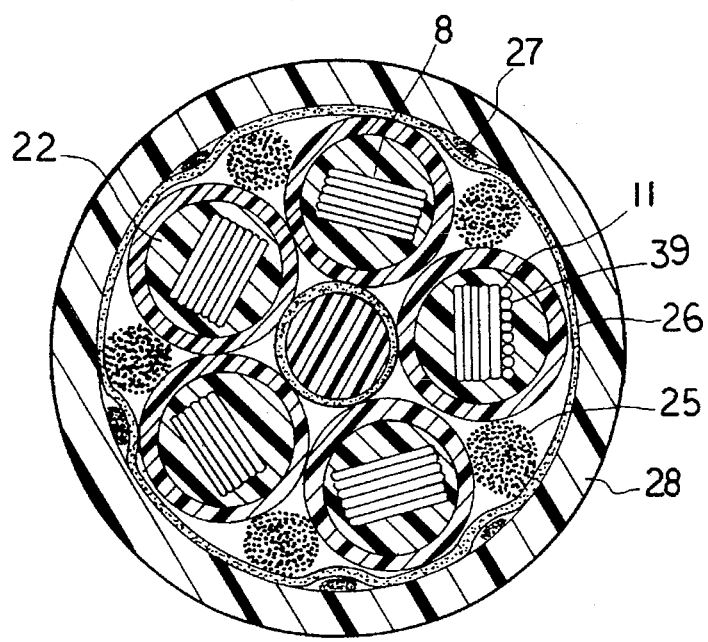
FIG. 2 is a cross-sectional view along lines 2—2 of the cable of FIG. 1.

The cable in FIGS. 1 and 2 includes inner tubes 7, which are formed of a plastic material such as polypropylene. Tubes 7 are each extruded around optical fibers, optical fiber bundles, or a stack 8 of optical fiber ribbons 11. A water-blocking filling compound 22 fills the interior space of each tube 7 not otherwise occupied by an optical fiber, optical fiber bundle, optical fiber ribbon, or stack of optical fiber ribbons. Prior art filling compounds include those disclosed in U.S. Pat. Nos. 4,720,164; 4,772,091; 4,810,429; 4,839,970; 4,857,242; and 5,335,302.

Stacks 8 of optical fiber ribbons may or may not be twisted with an intended lay within a respective tube 7. A preferred degree of twist of a stack 8 of optical fiber ribbons is 600 mm/rev. In a preferred embodiment, stacks 8 of optical fiber ribbons have no substantial excess length as compared to the respective inner tube 7 containing such stack.

Figure 5:
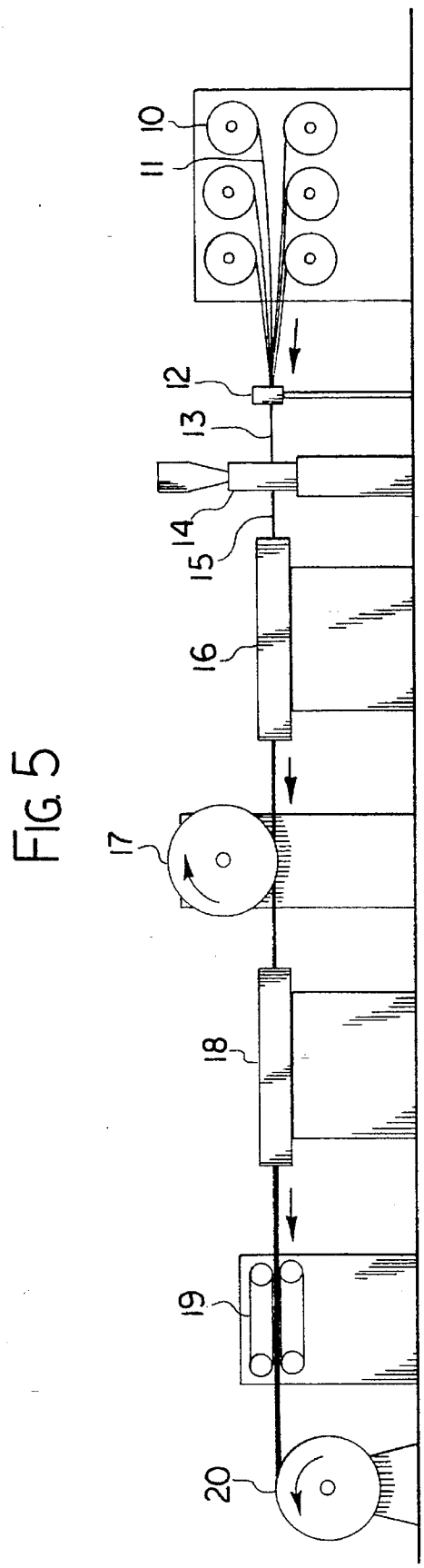
FIG. 5 is a schematic view of a buffering line used in manufacturing a cable according to the invention; and, FIG. 6 is a schematic view of the terminal portion of a stranding line used in manufacturing a cable according to the invention.

To simplify stranding, the extrusion of inner tubes 7 over stacks 8 of optical ribbons and filling compound 22 takes place prior to stranding. As shown in FIG. 5, optical fiber ribbons 11 are drawn from rotating spools 10. Optical fiber ribbons 11 each comprise a planar array of coated optical fibers 39 embedded in a common coating or matrix material. Spools 10 are held in a device also causing them to revolve about the longitudinal axis of the ribbon stack which generally lies between the three upper spools and the three lower spools shown in FIG. 5. Ribbons 11 are then drawn through a wiping die 12 held in a rotatable journal through which a viscous substance 22 is provided, as more fully described in commonly assigned U.S. Pat. No. 5,348,586, thereby forming a coated ribbon stack 13. The coated ribbon stack 13 is then drawn through extruder 14, which extrudes a buffer tube 7 over the coated ribbon stack to form an element 15. Element 15 is then drawn through a water bath 16, drawn a full turn around a sheave 17, drawn through a second water bath 18, and proceeds through a belt drive drawing device 19 and onto take-up reel 20.

Shown below in Table 1 are the results of an experiment conducted to determine the effect on increased energy attenuation in the optical fibers of minimizing excess ribbon length in the buffer tubes 7. Excess ribbon length is the amount by which the length of the optical fiber ribbons exceeds the length of the tube 7 containing such ribbons.

TABLE 1

Increased optical attenuation of optical fibers as affected by excess ribbon length

| Tube inner diameter (mm) | Excess ribbon length (%) | increased attenuation at −40° C., dB/km at 1550 nm |
| --- | --- | --- |
| 5.05 | 0.23 | 0.11 |
| 5.05 | 0.12 | 0.02 |
| 5.60 | 0.10 | 0.02 |
| 5.10 | 0.08 | 0.04 |
| 5.50 | 0.04 | 0.01 |
| 5.50 | 0.02 | 0.02 |
| 5.55 | 0.01 | 0.02 |
| 5.05 | 0.01 | 0.01 |

Table 1 indicates that increased attenuation is minimized by maintaining the excess ribbon length to 0.04% or less, which is a length not substantially greater than the length of the buffer tube holding the optical fiber ribbons.

A longitudinally extending central member 9 is substantially inextensible and incompressible in comparison with other elements of the cable to provide protection to the cable against strains arising from materials contraction at low temperatures. Central member 9 may be formed of a metallic material such as steel, or central member 9 may be formed of a nonmetallic dielectric material, particularly if an all-dielectric cable is desired. In a preferred embodiment of the invention, the central member is formed of a dielectric glass reinforced plastic material having a Young's Modulus of 52.0 KN/mm$^2$ and a thermal expansion coefficient of $5.9 \times 10^{-6}$ mm/mm/°C.

A water absorbent material is needed to prevent the ingress of water along open spaces in the cable, such as the interstices between central member 9 and inner buffer tubes 7. A longitudinally extending swellable tape 23 comprising water-absorbent material is wrapped without a substantial degree of lay around central member 9. When a water-swellable tape was helically wrapped around the central member and the cable was subjected to a water penetration test, it was found that water quickly spread through a one meter length of cable. However, when the water-swellable tape was wrapped longitudinally around the central member with the overlapping edges 24 of the tape proceeding parallel to the central member without a substantial degree of lay, it was found that the cable passed a standard water penetration test. The reason for the difference in results may be that a helical wrapping with lay of the water-swellable tape constricts the water-swellable tape around the central member, thereby restricting the ability of the tape to expand, while a longitudinal wrapping of the water-swellable tape around the central member without lay does not constrict the water-swellable tape, allowing the water-swellable tape to freely expand upon contact with moisture to completely fill the interstices between the central member 9 and inner buffer tubes 7, which are disposed adjacent to tape 24.

A plurality of yarns 25 formed of water-swellable material is laid around buffer tubes 7. Each yarn 25 is disposed in an interstice between adjacent buffer tubes 7 and water-swellable tape 26, which covers the buffer tubes. Tape 26 substantially inhibits any ingress of moisture penetrating through outer sheath 28 to tubes 7. A yarn 25 may contact the tape 26 and the adjacent inner tubes 25. A plurality of antibuckling members 27 surrounds tape 26; however, tensile yarns of aramid fiber or other tensile strength filaments may be substituted for members 27, or the members 27 may be omitted if central member 9 is to serve as the cable tensile and compressive strength member. An outer sheath 28, formed of a polymer material such as polyethylene, is substantially fluid impervious and contains the central member and tape 24. The telecommunication elements, such as optical fiber ribbons 11, are disposed between tape 24 and outer sheath 28.

Figure 3:
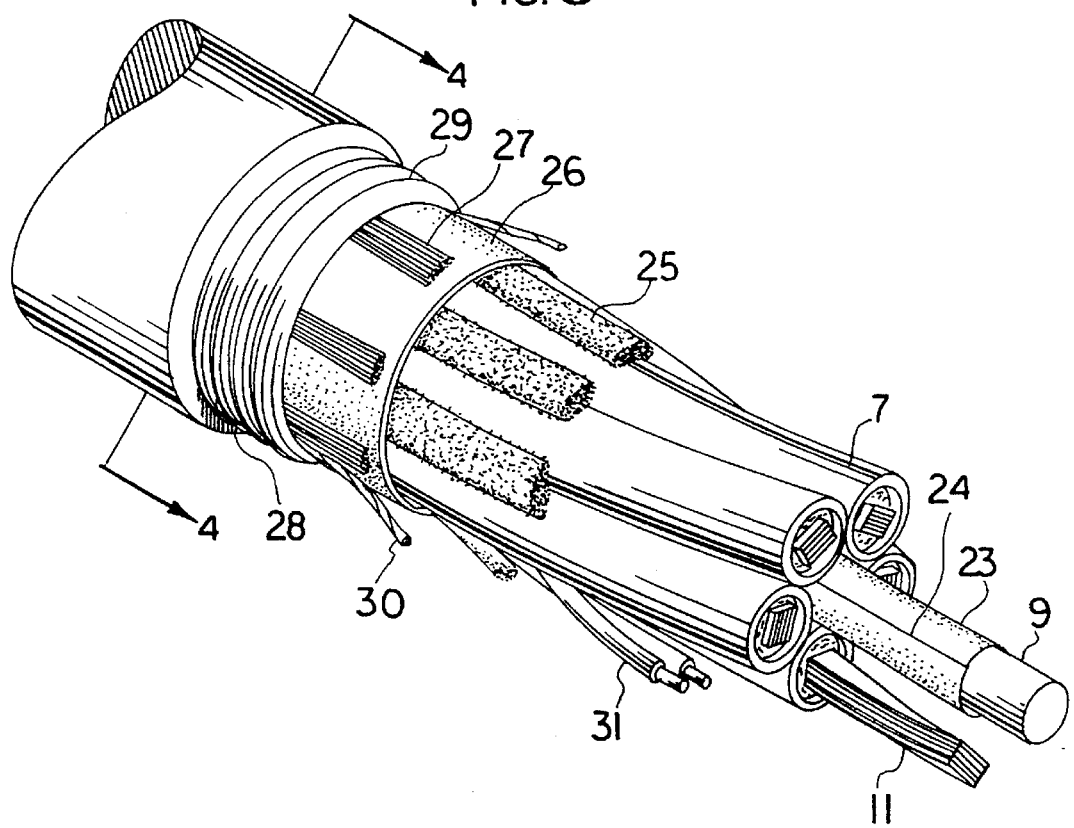
FIG. 3 is a perspective view of an alternate embodiment of an improved optical fiber cable according to the invention.
Figure 4:
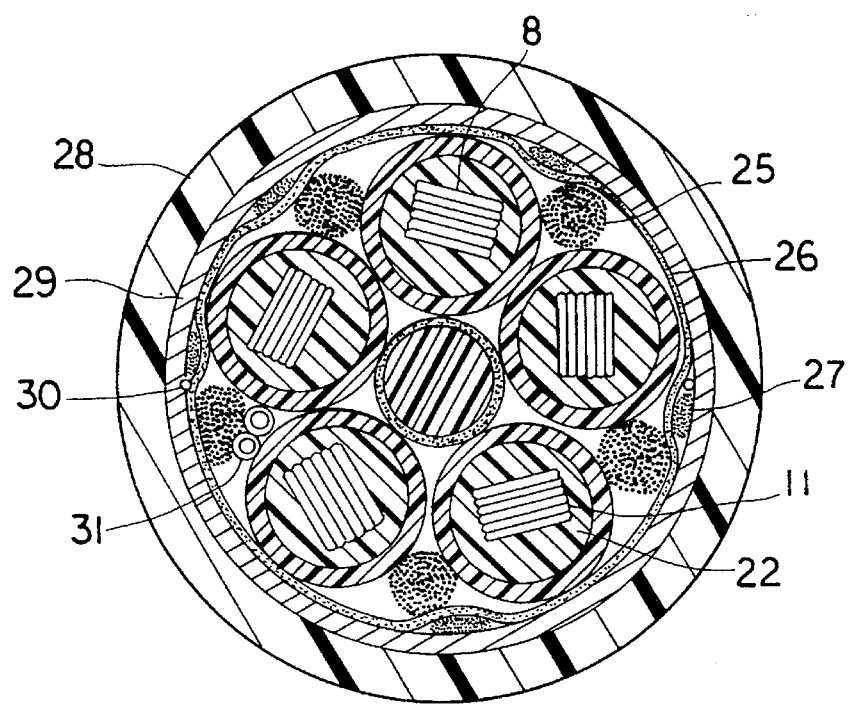
FIG. 4 is a cross-sectional view along lines 4—4 of the cable of FIG. 3.

In an armored version of a cable according to the invention as shown in FIGS. 3 and 4, a layer of corrugated metallic armor 29 underlies outer sheath 28. Armor 29 may be formed of a steel tape. Underlying armor 29 are ripcords 30. If desired, a twisted pair 31 of electrical conductors, such as 22 AWG insulated wires, may be inserted in an interstice between adjacent buffer tubes 7 and the covering water-swellable tape 26. Such placement advantageously conserves space in the cable, as opposed to placing the electrical conductors between two adjacent buffer tubes 7.

Figure 6:
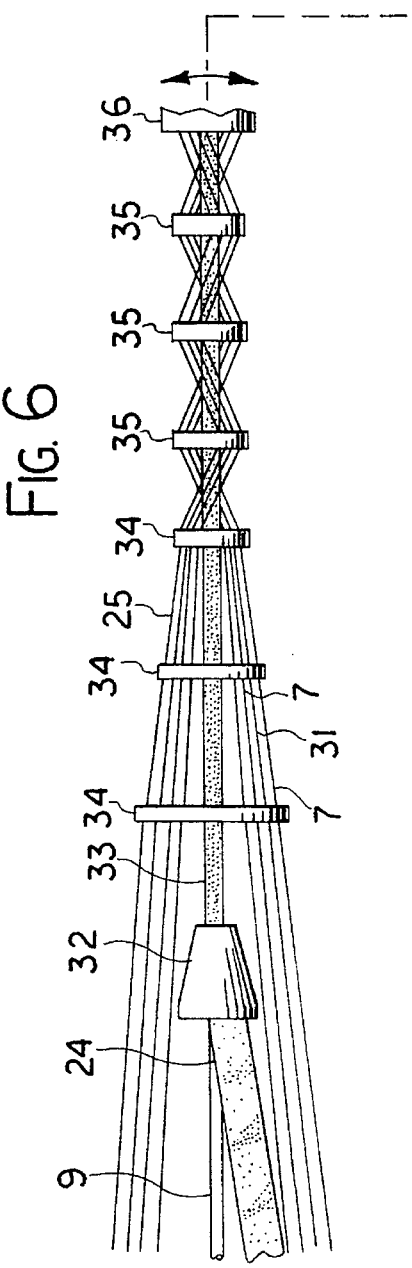
Figure 6:
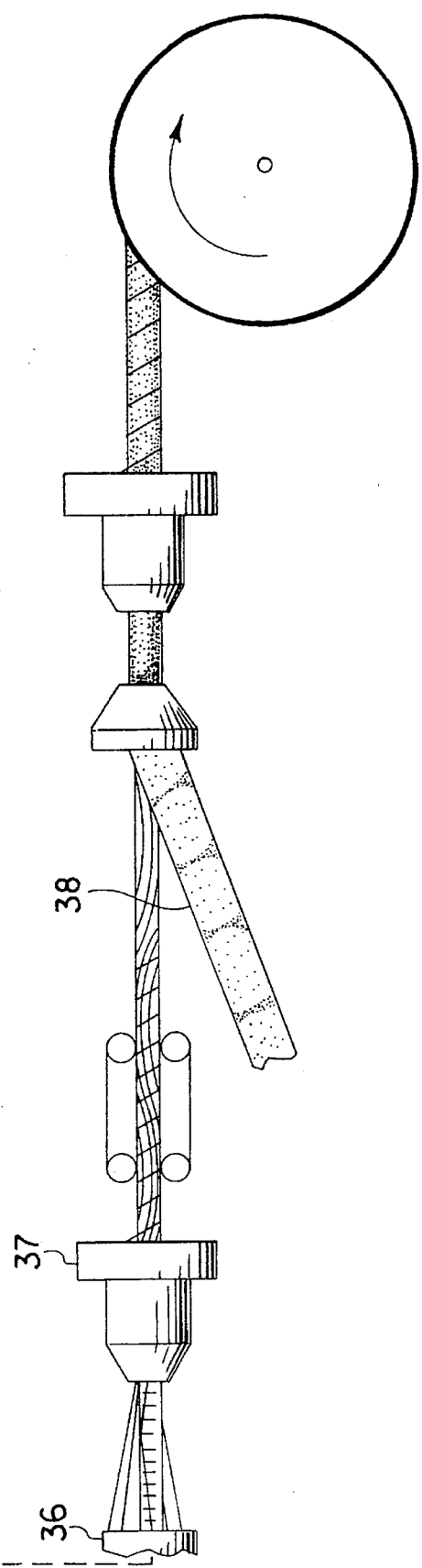

Stranding of the cable will be described with reference to FIG. 6. The longitudinal wrapping of the water-swellable tape 23 around central member 9 without lay is accomplished by tying overlapping ends of the tape around the central member at the start-up of the cable stranding line and drawing the central member and tape through a rigid tube 33 having an entrance port 32 with a conical shape. The tape is wrapped around the central member without lay in the process of being pulled with the central member through the conical-shaped tube entrance port.

The rigid tube 33 carrying the central member and water-swellable tape also serves as an accumulator around which the reverse alternating stranding of the buffer tubes, yarns, and electrical conductors takes place. The accumulator passes through respective openings in each of a plurality of longitudinally spaced apart fixed layplates 34, a plurality of longitudinally spaced apart layplates 35 which are free to rotate around the accumulator, and a layplate 36 which is rotationally driven around the accumulator alternatingly in a first direction and then in the opposite direction to provide the tubes 7, yarns 25, and twisted pair 31 with a reverse alternating lay. Filled inner tubes 7, water-swellable yarns 25, and insulated electrical conductors 31 are passed through respective holes near the outer rim of each layplate as is known to the prior art. The freely rotating layplates alternatingly rotate in one direction and the opposite direction responsive to forces exerted on the layplates by the elements being stranded. The freely rotating layplates serve to keep the cable elements from becoming entangled one with another during stranding.

Tubes 7 are stranded side-by-side in a periodically reversing alternating hand helix around central member 9. The tubes preferably have a lay length of 500 to 600 mm produced by the rotationally driven lay plate. Preferably, the tubes turn about four times about the central member between periodic reversals of the rotationally driven lay plate.

Immediately downstream of the driven layplate 36, the central member, water-swellable tape, stranded tubes, yarns, and electrical conductors pass through a closing die and binder tape wrapping station 37. A second water-swellable tape 38 may then be applied, and a second binder tape is applied over the second water-swellable tape. The cable core then passes onto a takeup reel.

Outer sheath 28 is placed on the cable core in a separate jacketing line. If strength members 27, armor 29 and ripcords 30 are to be applied, they will also be applied in the jacketing line.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A telecommunications cable, comprising:

a longitudinally extending central strength member;

a longitudinally extending tape comprising water-absorptive material, said tape wrapped around the central member without a substantial degree of lay;

an outer substantially fluid impervious plastic sheath surrounding the wrapped central member, said sheath delimiting a first space between said tape and the outer sheath; and, at least one telecommunication element disposed within the first space.

2. A cable as set out in claim 1, further comprising a plurality of tubes disposed in the first space surrounding and adjacent to the tape, and wherein said tape is expandable upon exposure to water.

3. A cable as set out in claim 2, wherein said at least one telecommunication element is embedded in a longitudinally extending ribbon contained within one of said tubes.

4. An optical fiber cable as set out in claim 3, wherein the length of said optical fiber ribbon is not substantially greater than the length of said tube.

5. A cable containing optical fibers and at least one pair of electrical conductors, comprising:

a plurality of inner tubes, at least one of said tubes containing an optical fiber ribbon, the inner tubes stranded side-by-side in an alternating hand helix around a longitudinally extending central member which is substantially inextensible and incompressible in comparison with the tubes;

an outer layer of material surrounding the inner tubes so as to delimit interstices between respective adjacent inner tubes and the outer layer; and, at least one electrical conductor disposed in one of said interstices.

6. A cable as set out in claim 5, further comprising water-blocking yarn disposed in at least one of said interstices.

7. A cable as set out in claim 6, wherein said water-blocking yarn contacts said outer layer of material and the adjacent inner tubes delimiting the interstice in which the waterblocking yarn is disposed.

8. An optical fiber cable as set out in claim 5, wherein the length of the optical fiber ribbons is not substantially greater than the length of the first tube containing the optical fiber ribbons.

9. An optical fiber cable, comprising:

a central member;

a plurality of inner tubes wound around said central member in an alternating hand helix;

a plurality of optical fiber ribbons and a water blocking material contained in a first tube of said inner tubes, each ribbon comprising a plurality of optical fibers held in a planar array in a common coating material;

an outer sheath containing said inner tubes;

a tape enclosing said inner tubes disposed between said inner tubes and said outer sheath and delimiting interstices between respective adjacent inner tubes and said tape, said tape substantially inhibiting any ingress of moisture penetrating through the outer sheath to the inner tubes; and, a water-swellable yarn disposed in at least one of said interstices.

10. An optical fiber cable as set out in claim 9, wherein the first tube has a wall thickness of less than 1 mm.

11. An optical fiber cable as set out in claim 9, further comprising at least one metallic conductor disposed in at least one of said interspaces.

12. An optical fiber cable as set out in claim 9, further comprising a water swellable material surrounding and contacting said central member.

13. An optical fiber cable as set out in claim 9, wherein the length of the optical fiber ribbons is not substantially greater than the length of the first tube containing the optical fiber ribbons.

* * * * *